US010846278B2

(12) United States Patent
Mizell

(10) Patent No.: US 10,846,278 B2
(45) Date of Patent: *Nov. 24, 2020

(54) DYNAMIC UPDATES TO A SEMANTIC DATABASE USING FINE-GRAIN LOCKING

(71) Applicant: Cray Inc., Seattle, WA (US)

(72) Inventor: David Mizell, Sammamish, WA (US)

(73) Assignee: Cray Inc., Seattle, WA (US)

( * ) Notice: Subject to any disclaimer, the term of this patent is extended or adjusted under 35 U.S.C. 154(b) by 995 days.

This patent is subject to a terminal disclaimer.

(21) Appl. No.: 14/693,534

(22) Filed: Apr. 22, 2015

(65) Prior Publication Data
US 2015/0227570 A1 Aug. 13, 2015

Related U.S. Application Data

(63) Continuation of application No. 13/623,688, filed on Sep. 20, 2012, now Pat. No. 9,047,333.

(51) Int. Cl.
*G06F 16/23* (2019.01)
*G06F 16/84* (2019.01)
*G06F 16/22* (2019.01)

(52) U.S. Cl.
CPC ...... *G06F 16/2308* (2019.01); *G06F 16/2228* (2019.01); *G06F 16/86* (2019.01); *G06F 16/2255* (2019.01)

(58) Field of Classification Search
CPC ......... G06F 17/30348; G06F 17/30321; G06F 17/30917; G06F 16/2308; G06F 16/86; G06F 16/2228; G06F 16/2255
(Continued)

(56) References Cited

U.S. PATENT DOCUMENTS 6,144,983 A * 11/2000 Klots ............... G06F 9/52
707/999.008
6,353,829 B1 * 3/2002 Koblenz ........... G06F 12/023
707/999.1
(Continued)

OTHER PUBLICATIONS

Goodman, Eric L. et al., "High-performance Computing Applied to Semantic Databases", ESWC '11, Proceedings of the 8th Extended Semantic Web Conference on the Semanic Web: Research and Applications—vol. Part II, Springer-Verlag Berlin, Heidelberg, 2011, pp. 31-45.

(Continued)

*Primary Examiner* — Phong H Nguyen
(74) *Attorney, Agent, or Firm* — Sheppard Mullin Richter & Hampton LLP

(57) ABSTRACT

A system for updating an index into a tuple table of tuples is provided. An indexing system updates an index into a tuple table using fine-grain locking of the index. The index includes a values table with an entry for each index value of an index field that references a value-tuple table that includes, for each tuple with the index value, a row that identifies a tuple of the tuple table with that indexed value. After a new tuple is added to the tuple table with a value, the index is updated by locking the entry in the values table, updating the value-tuple table for the value, and then unlocking the entry. When the index is accessed for locating tuples with a value, the accessor locks the entry in the values table for the value, uses the value-tuple table to locate the tuples, and unlocks the entry.

3 Claims, 8 Drawing Sheets

(58) Field of Classification Search
USPC .. 707/E17.005, E17.045, 696, E17.083, 741
See application file for complete search history.

(56) References Cited

U.S. PATENT DOCUMENTS

| | | | |
|---|---|---|---|
| 7,680,862 B2 | 3/2010 | Chong et al. | |
| 8,010,497 B2* | 8/2011 | Verma | G06F 16/22 |
| | | | 707/662 |
| 8,078,646 B2* | 12/2011 | Das | G06F 16/2255 |
| | | | 707/802 |
| 8,560,511 B1* | 10/2013 | Matthews | H04L 43/16 |
| | | | 707/704 |
| 8,719,250 B2 | 5/2014 | Chong et al. | |
| 8,782,017 B2 | 7/2014 | Das et al. | |
| 9,047,333 B2 | 6/2015 | Mizell | |
| 2005/0234989 A1* | 10/2005 | Bailey | G06F 16/2343 |
| | | | 707/999.107 |
| 2006/0235823 A1* | 10/2006 | Chong | G06F 16/2455 |
| | | | 707/E17.005 |
| 2006/0235837 A1* | 10/2006 | Chong | G06F 16/24534 |
| | | | 707/E17.005 |
| 2007/0233683 A1* | 10/2007 | Verma | G06F 9/466 |
| | | | 707/999.008 |
| 2010/0036862 A1* | 2/2010 | Das | G06F 16/86 |
| | | | 707/698 |
| 2012/0084271 A1* | 4/2012 | Das | G06F 16/86 |
| | | | 707/693 |

OTHER PUBLICATIONS

Goodman, E. et al., "Scalable In-memory RDFS Closure on Billions of Triples," The 6th International Workshop on Scalable Semantic Web Knowledge Base Systems, Nov. 2010, pp. 17-31.

* cited by examiner

DYNAMIC UPDATES TO A SEMANTIC DATABASE USING FINE-GRAIN LOCKING

CROSS-REFERENCE TO RELATED APPLICATION(S)

This application is a continuation of U.S. patent application Ser. No. 13/623,688 filed Sep. 20, 2012, entitled "DYNAMIC UPDATES TO A SEMANTIC DATABASE USING FINE-GRAIN LOCKING" which is incorporated herein by reference in its entirety.

BACKGROUND

Semantic data models allow relationships between resources to be modeled as facts. The facts are often represented as triples that have a subject, a predicate, and an object. For example, one triple may have the subject of "John Smith," the predicate of "ISA," and the object of "physician," which may be represented as
<John Smith, is-a, physician>.
This triple represents the fact that John Smith is a physician. Other triples may be
<John Smith, graduate of, University of Washington>
representing the fact that John Smith graduated from the University of Washington and
<John Smith, degree, MD>
representing the fact that John Smith has an MD degree. Semantic data models can be used to model the relationships between various types of resources such as web pages, people, companies, products, meetings, and so on. One semantic data model, referred to as the Resource Description Framework ("RDF"), has been developed by the World Wide Web Consortium ("W3C") to model web resources, but it can be used to model any type of resource. The triples of a semantic data model may be stored in a semantic database.

To search for facts of interest, a user may submit a query to a search engine and receive as results the facts that match the query. A query may be specified using SPARQL, which is a query language that has been developed for semantic databases that comply with the RDF format. The acronym "SPARQL" stands for "Simple Protocol and RDF Query Language." A SPARQL query may include a "select" clause and a "where" clause as shown in the following example:
select ?profession
where {?x degree ?profession}.
The select clause includes the variable "?profession," and the where clause includes the query triple with the variable "?x" as the subject, the non-variable "degree" as the predicate, and the variable "?profession" as the object. When a search engine executes this query, it identifies all triples of the database that match the non-variable(s) of the query triple. In this example, the search engine identifies all triples with a predicate of "degree" and returns the objects of those identified triples based on the variable "?profession" being in the select clause and in the object of the query triple of the where clause. For example, the search engine will return "MD" and "JD" when the database contains the following facts:
<John Smith, degree, MD>
<Bill Greene, degree, JD>.
If the select clause had also included the variable "?x," then the search engine would have returned "John Smith, MD" and "Bill Greene, JD."

SPARQL allows multiple query triples to be included in the where clause to create more queries such as the following example query:

| select ?profession where { | | | |
|---|---|---|---|
| ?x | degree | ?profession | (Example 1) |
| ?x | livesin | USA | |
| ?x | citizenof | USA | |
| ?x | is-a | professor | |
| ?profession | is-a | law degree} | |

This example query will return the various law degrees of professors who are U.S. citizens and who live in the United States, such as a B.S. in legal studies, a J.D., and an LL.M.

To identify the results for a query, a search engine identifies the triples that match each query triple. A triple matches a query triple when the triple matches each defined or non-variable element of the query triple. When a triple matches, its values are bound to the variables of the query triple. A search engine generates the results by taking intersections of the values bound to the variables of the query triples. In Example 1 above, because the where clause has five query triples, the search engine may identify five sets of triples. The first set will contain triples with the predicate "degree," the second set will contain triples with the predicate of "livesin" and the object of "USA," the third set will contain triples with the predicate of "citizenof" and the object of "USA," the fourth set will contain triples with the predicate of "is-a" and the object of "professor," and the fifth set will contain triples with the predicate of "is-a" and the object of "law degree." After generating the sets, the search engine identifies the triples of the first set whose subject is also the subject of a triple in the second, third, and fourth sets and then returns those identified triples whose object is also the subject of a triple in the fifth set.

Current collections of triples can contain billions of triples. Because of the large size of the collections, indexing may be used to speed up the searching for triples that have certain values for their subject, predicate, or object. FIG. 1 is a block diagram illustrating data structures for indexing into a triple table. The data structures include a subject index 110 and an object index 120 for a triple table 130. In the example of FIG. 1, the triple table includes six triples with numeric identifiers of their subjects, predicates, and objects. For example, the first triple in the triple table is <1, 3, 2>, which may represent the triple <John Smith, is-a, physician>. The subject index maps subjects to the triples that contain those subjects and includes a subject values table 111 and a subject value-triple table 112. The subject values table includes an entry corresponding to each different subject of the triple table. For example, the second entry in the subject values table corresponds to the subject represented by the identifier of 2 (i.e., subject 2). Each entry includes a row and an optional count field. The row points to a row in the subject value-triple table. The count indicates the number of triples in the triple table with that subject and is optional because the count can be derived from the differences in the rows of the subject values table. The subject value-triple table contains a row for each triple of the triple table ordered by the identifiers of the subject. For example, rows 1 and 2 of the subject value-triple table point to triples 1 and 6 of the triple table for subject 1. The object index includes an object values table 121 and an object value-triple table 122. The object index maps objects to triples that contain those objects in a way that is similar to the way the subject index maps subjects to triples. Also, a predicate index may map predicates to triples that contain those predicates in a similar way Although the indexing can speed up the locating of triples, the updating of the indexes to reflect newly added triples can be very time-consuming and require exclusive access to the data structures during the updating. For example, if a new triple of <1, 2, 3> is added to the triple table as triple 7, then rows 3-6 of the subject value-triple table may need to be shifted down one row each to make room for the row corresponding to the newly added triple. However, during this shifting and prior to updating the offsets of the subject values table, the subject index would be in an inconsistent state. For example, after shifting is complete but before the row values of the subject values table are updated, entry 5 of the subject values table corresponding to subject 5 would point to row 6 of the subject value-triple table, which would point to triple 5 of the triple table. Triple 5, however, contains subject 3, not subject 5. So a program that uses the subject index to retrieve the triples for subject 5 would mistakenly retrieve a triple with subject 3.

To avoid this inconsistency, a program updating the index acquires exclusive access to the data structures or at least the subject index to prevent another program from accessing the subject index while it is in an inconsistent state. It is, however, undesirable to prevent such other program from accessing the data structures for the relatively long time it may take to update the subject index.

DETAILED DESCRIPTION

A system for updating an index into a tuple table of tuples is provided. In some embodiments, an indexing system updates an index into a tuple table using fine-grain locking of the index. The index includes a values table with an entry for each index value of an index field that references a value-tuple table that includes, for each tuple with the index value, a row that identifies a tuple of the tuple table with that indexed value. After a writer adds a new tuple to the tuple table, the writer updates the index by locking the entry in the values table for the index value of the new tuple, updating the value-tuple table for that index value, and then unlocking the locked entry. When a reader uses the index to locate tuples with a certain index value, the reader locks the entry in the values table for that index value, uses the value-tuple table to locate the tuples with that index value, and unlocks the unlocked entry. In this way, the readers and writers can use the index concurrently by locking only small portions of the index at a time and avoiding the need for a writer to have exclusive access to the entire index.

Figure 1:
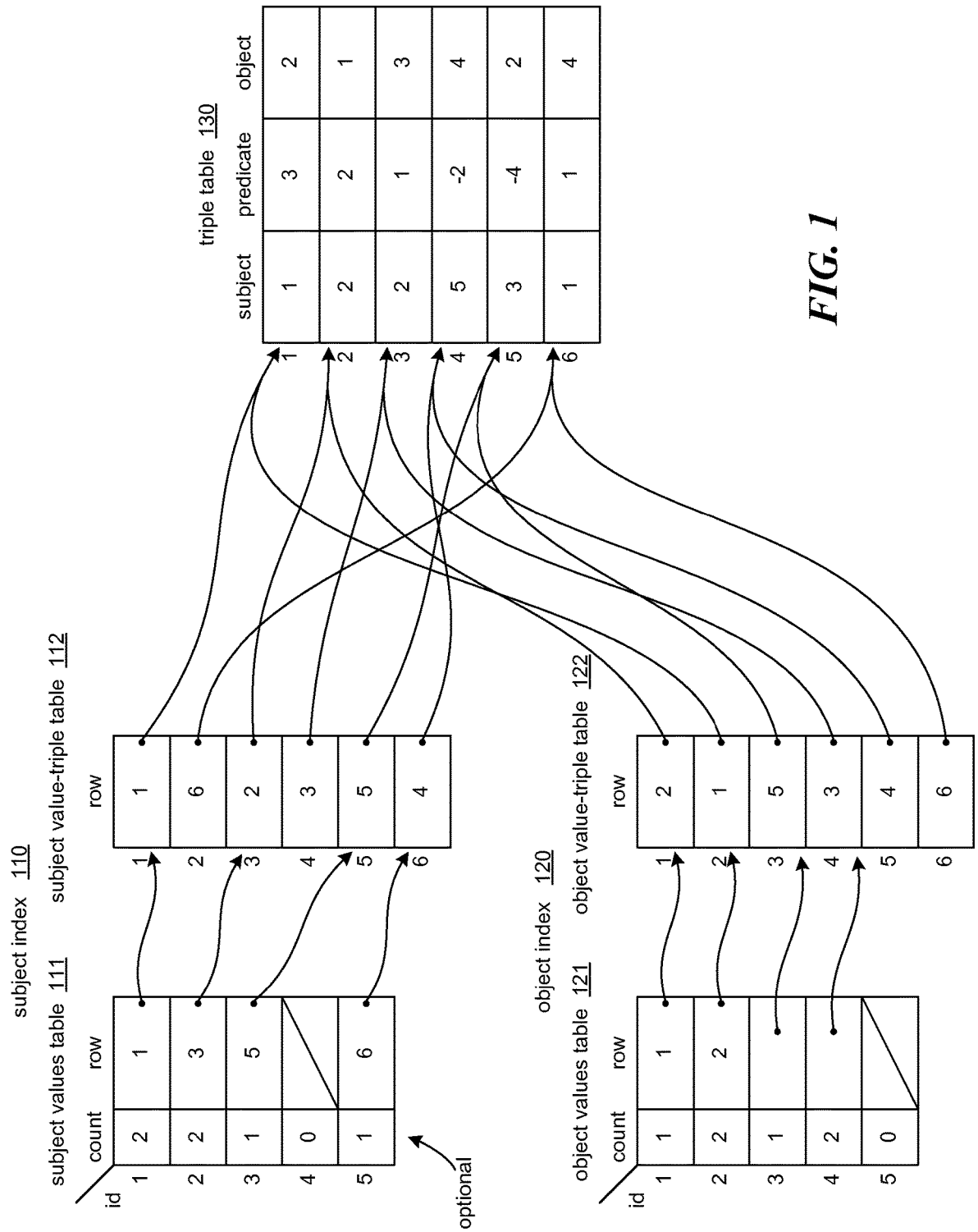
FIG. 1 is a block diagram illustrating data structures for indexing into a triple table.

In some embodiments, the indexing system generates an index that maps values of an indexed field to the tuples that contain those values. For example, the indexed field may be the subject of a triple, and the indexing system may generate a subject index for a triple table. The index may include a values table and, for each value of the index field, a value-tuple table. The value-tuple table for a value includes, for each tuple that contains that value, a row that identifies that tuple. For example, the value-triple table for subject 1 of the triple table of FIG. 1 would contain a row that points to triple 1 and a row that points to triple 6 of the triple table and its corresponding count would be two. The values table includes an entry for each value of the indexed field and each entry includes a reference to the corresponding value-tuple table and a count of the number of rows in the corresponding value-tuple table. When a new tuple is added to the tuple table, the indexing system updates the index by locking the value-tuple for the index value of the new tuple. The indexing system then allocates a replacement value-tuple table to replace the current value-tuple table for the index value of the new tuple. For example, the replacement value-tuple table may have one more row than the current value-tuple table. The indexing system then, for each tuple of the tuple table that includes the index value of the new tuple (including the newly added tuple), populates a row of the replacement value-tuple table to identify that tuple. For example, the indexing system may copy all the rows from the current value-tuple table to the replacement value-tuple table and then populate the extra row to identify the new tuple. The indexing system also sets the count to the number of rows in the replacement value-tuple table. Finally, the indexing system updates the reference of the entry in the values table for the index value of the new tuple to replace the reference to the current value-tuple table with a reference to the replacement value-tuple table. Finally, the indexing system unlocks the entry in the values table for the index value of the new tuple to complete the updating of the index.

In some embodiments, the indexing system locks a value-tuple table before reading from or updating the value-tuple table and unlocks the value-tuple table after reading from or updating the value-tuple table. By locking the value-tuple tables individually, the indexing system performs fine-grain locking that limits exclusive access only to portions of the index during reading or updating of the index in a way that allows other portions of the index to be accessed concurrently. In some embodiments, since only one accessor (i.e., reader or writer) can have access to a locked portion at a time, the portion that a reader locks will be in a consistent state during the reading. Since a tuple table will typically have many unique values of an indexed field, each value-tuple table will typically represent only a small fraction of the tuple table. Many readers of a tuple table, such as those that submit SPARQL queries, exhibit a pattern of repeatedly locating all the tuples for different index values. When these algorithms use the indexing system, the reader locks the needed value-tuple tables for only short periods of time. Thus, because there are so many value-tuple tables relative to the number of readers and the readers lock the value-tuple tables for only short periods, the overhead incurred by the readers waiting on the locked value-tuple tables may be relatively small. Moreover, the overhead of waiting may be significantly less than would be incurred if exclusive access to the index was required when updating the index.

The indexing system may use synchronized access instructions of some computer architectures for locking and unlocking of a value-tuple table. Some computer architectures provide a full/empty bit for each memory location and synchronized writing (or storing) and synchronized reading (or loading) from the memory location. For example, the Cray XMT provides a full/empty bit for each memory location that indicates whether the memory location is currently full or empty. A synchronized write instruction writes to a memory location only when the memory location is empty and leaves the memory location full, referred to as a write empty/leave full instruction. A synchronized read instruction reads from a memory location only when the memory location is full and leaves the memory location empty, referred to as a read full/leave empty instruction. The synchronized instructions will not complete until the memory location is in an appropriate full or empty state. If multiple synchronized writes are issued to a memory location that is full, then the computer queues those writes for completion as synchronized reads to that memory location are issued. Similarly, if multiple synchronized reads are issued to a memory location that is empty, then the computer queues those reads for completion as synchronized writes to that memory location are issued. Aspects of the Cray XMT are described in U.S. Pat. No. 6,353,829, entitled "Method and System for Memory Allocation in a Multiprocessing Environment," which is hereby incorporated by reference.

In some embodiments, the indexing system may use various techniques that may improve performance depending on characteristics of the tuples and the read/write access patterns. For example, when allocating a new value-tuple table for an index value, the indexing system may allocate a table with more rows than needed to accommodate the current number of tuples that have that index value. When additional tuples with the index value are added to the tuple table, the indexing system can then populate these extra rows to identify these additional tuples and then update the count without locking the value-tuple table. The next reader (or writer) of that value-tuple table will lock that value-tuple table and retrieve the updated count and have access to the additional tuples. If a reader locks the value-tuple table after the new rows are added to the value-tuple table, but before the count is updated, the count and the value-tuple table might be considered inconsistent. But the reader would have a consistent view, just not a view that includes the newly added rows. In some embodiments, the indexing system may also use an end-of-table marker, rather than a count, to indicate the number of records (or the last record) in a value-tuple table. When a reader encounters a row of a value-tuple table with the end-of-table marker, the reader will know that all rows have been accessed. A value-tuple table may be implemented using various data structures. For example, a value-tuple table may be an array of memory locations that are contiguous (e.g., in a virtual address space) with each memory location corresponding to a row. Such contiguous memory locations may provide the optimal speed of access for the accessor. As another example, a value-tuple table may be implemented using a linked list data structure that may speed the updating of a table at the expense of added overhead when reading from the table. The indexing system may perform especially well in an environment with multiple readers and multiple, but infrequent, writers. Such an environment is common when using a SPARQL query to access a triple table. To facilitate access to the triples, the indexing system may provide a subject index for indexing the subjects, a predicate index for indexing the predicates, and an object index for indexing the objects.

Figure 2:
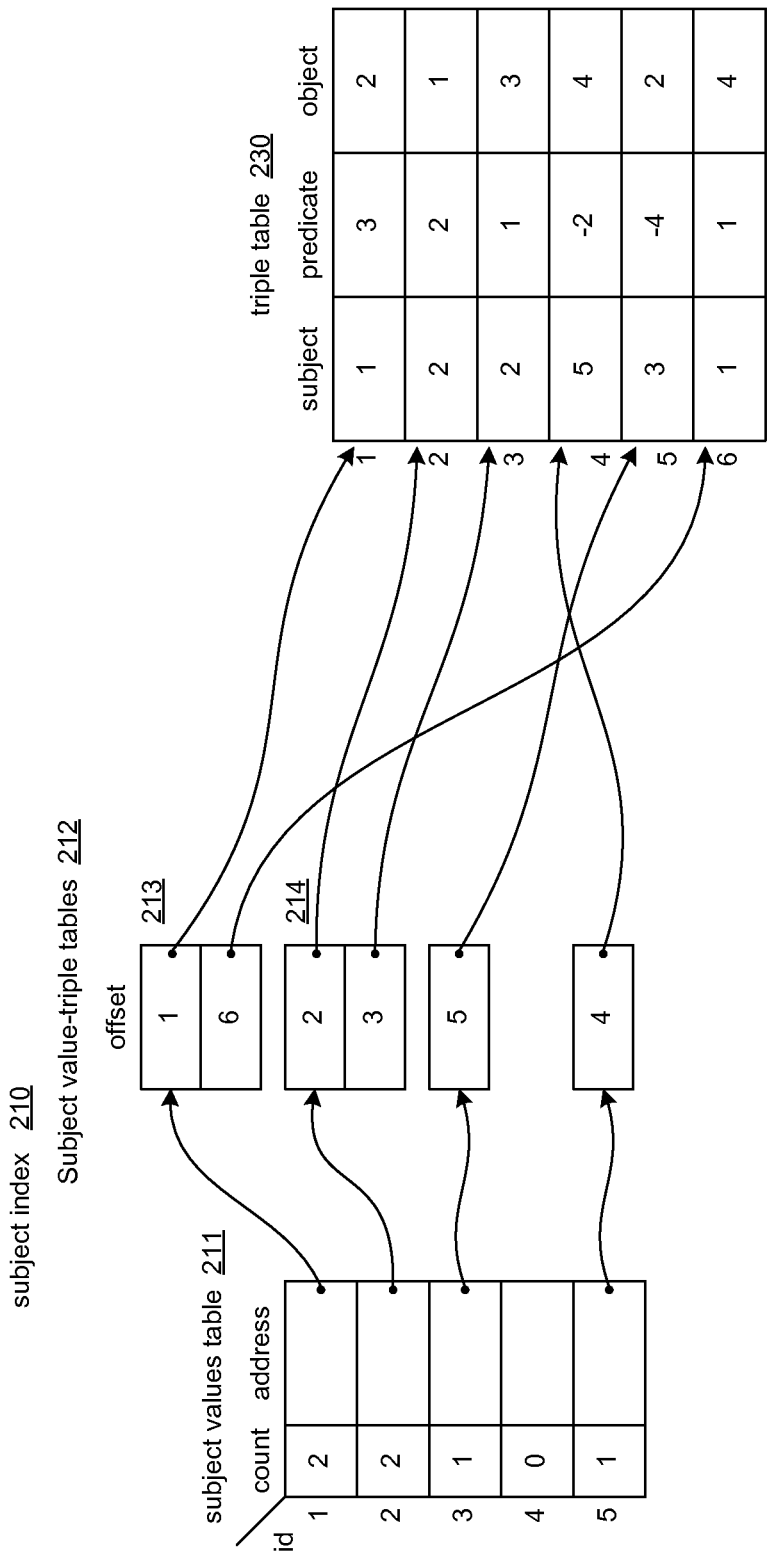
FIG. 2 is a block diagram illustrating a triple table and an index for an indexed field into the triple table in some embodiments.

FIG. 2 is a block diagram illustrating a triple table and an index for an indexed field into the triple table in some embodiments. The data structures include a subject index 210 and a triple table 230. The triple table contains the same triples as in triple table 130 of FIG. 1. The subject index includes a subject values table 211 and subject value-triple tables 212. The subject values table contains an entry for each unique subject of the triple table with each entry including a count and an address. The count of an entry for a subject indicates the number of triples in the triple table with that subject. The address is the address of or reference to the corresponding subject value-triple table for that subject. The subject value-triple table for a subject includes a row for each triple in the triple table with that subject, and each row contains the offset of the corresponding triple in the triple table. For example, the first entry of the subject values table corresponds to subject 1 and includes a count of two and an address that points to the corresponding subject value-triple table 213. The count of two indicates that the triple table contains two triples (triples 1 and 6) with subject 1. The subject value-triple table 213 contains two rows with the offsets (1 and 6) of the triples in the triple table with subject 1. A reader accesses the subject index for a subject by locking the entry in the subject values table for that subject (which also locks the corresponding subject value-triple table), retrieves the offsets from the corresponding subject value-triple table, uses the offsets to access the triples, and then unlocks the entry. For example, to access the subject index for subject 1, the reader issues a read full/leave empty instruction to the memory location storing the address of the entry in the subject values table for subject 1 to lock the entry, accesses the subject value-triple table referenced by the retrieved address, and then issues a write empty/leave full instruction to write the retrieved address back to the address of the entry in the subject values table for subject 1.

Figure 3:
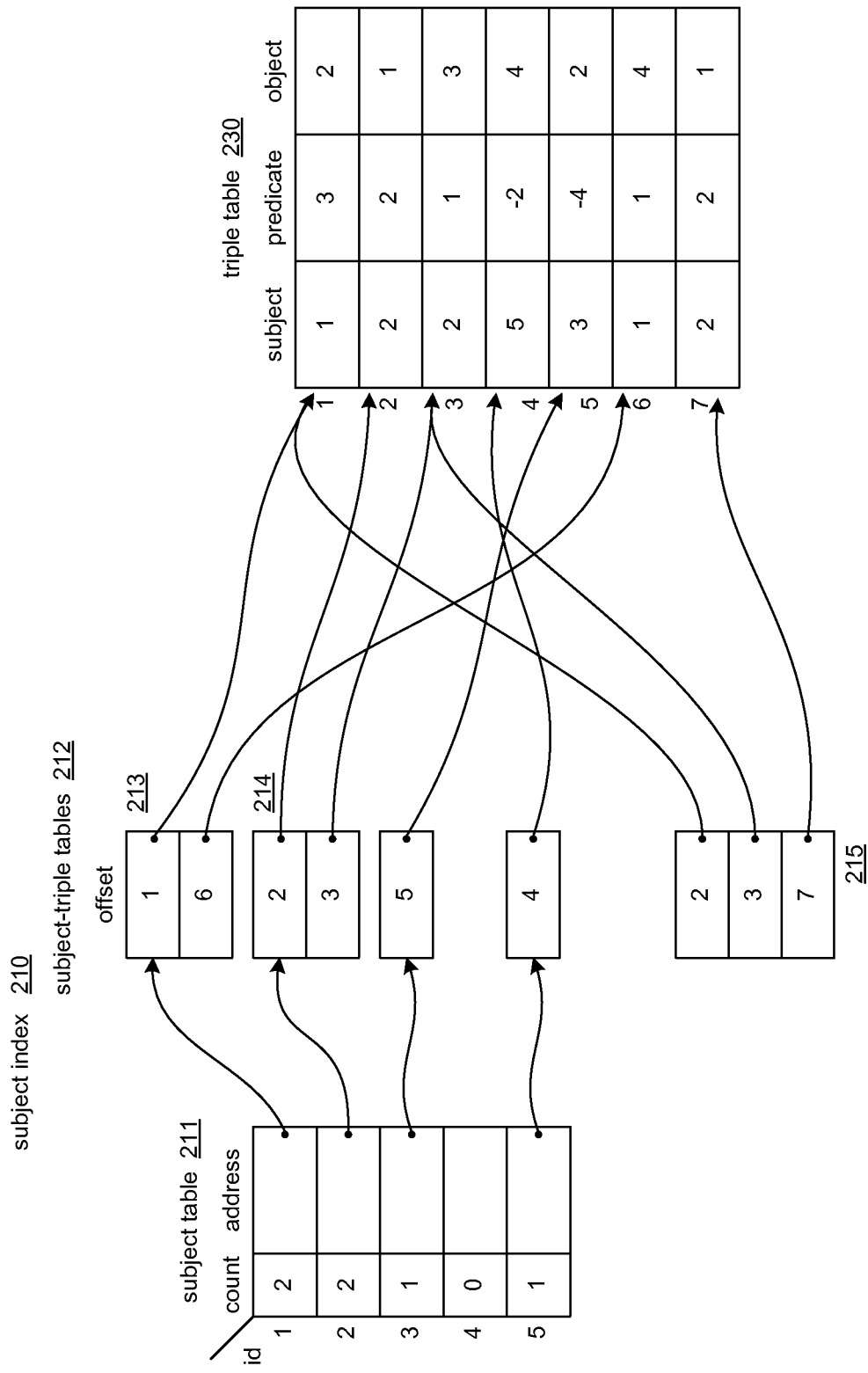
FIGS. 3 and 4 are block diagrams illustrating a triple table and an index for an indexed field into the triple table during the updating of the index in some embodiments.
Figure 4:
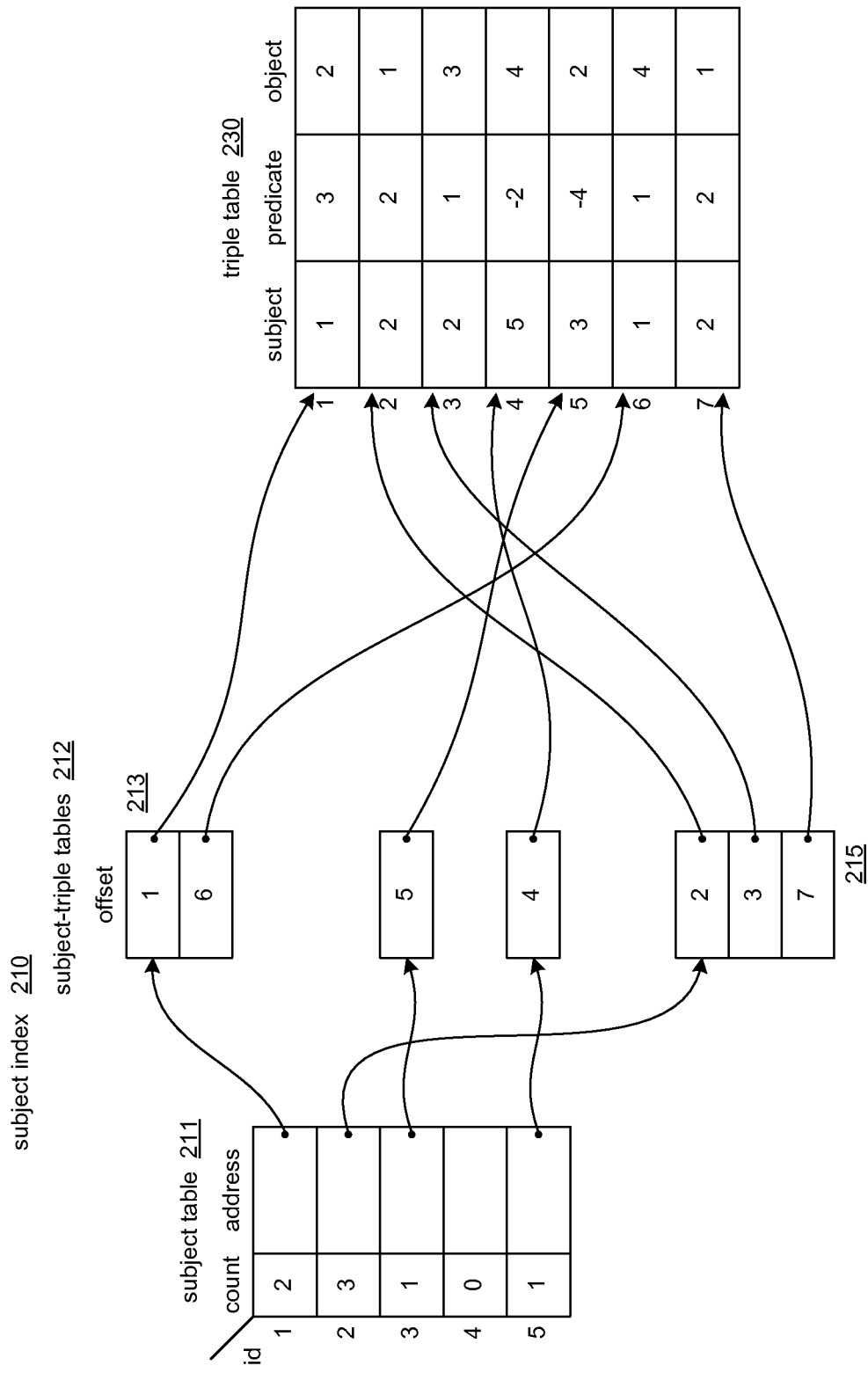

FIGS. 3 and 4 are block diagrams illustrating a triple table and an index for an indexed field into the triple table during the updating of the index in some embodiments. FIGS. 3 and 4 illustrate the adding of the triple <2, 2, 1> to the triple table. As illustrated in FIG. 3, a writer appends the triple to the end of the triple table as triple 7. The writer updates the subject index and, if there is a predicate index or an object index, also updates those indexes. To update the subject index, the writer locks the entry in the subject values table for subject 2, which retrieves the address of the current subject value-triple table 214, and retrieves the count of the rows in the subject value-triple table. The writer then allocates a replacement subject value-triple table 215 and populates the replacement subject value-triple table 215 by copying the rows from the current subject value-triple table 214 to the replacement subject value-triple table 215 and updating the last row of the replacement value-triple table 215 to have an offset of 7 to identify the newly added triple to the triple table. As illustrated in FIG. 4, the writer then updates the count in the entry for subject 2 in the subject values table 211 to reflect that the number of triples in the triple table that contains subject 2 is now 3 and unlocks that entry, which writes the address of the replacement subject value-triple table 215 to the address of the entry for subject 2. The writer may also de-allocate the subject value-triple table 214.

Figure 5:
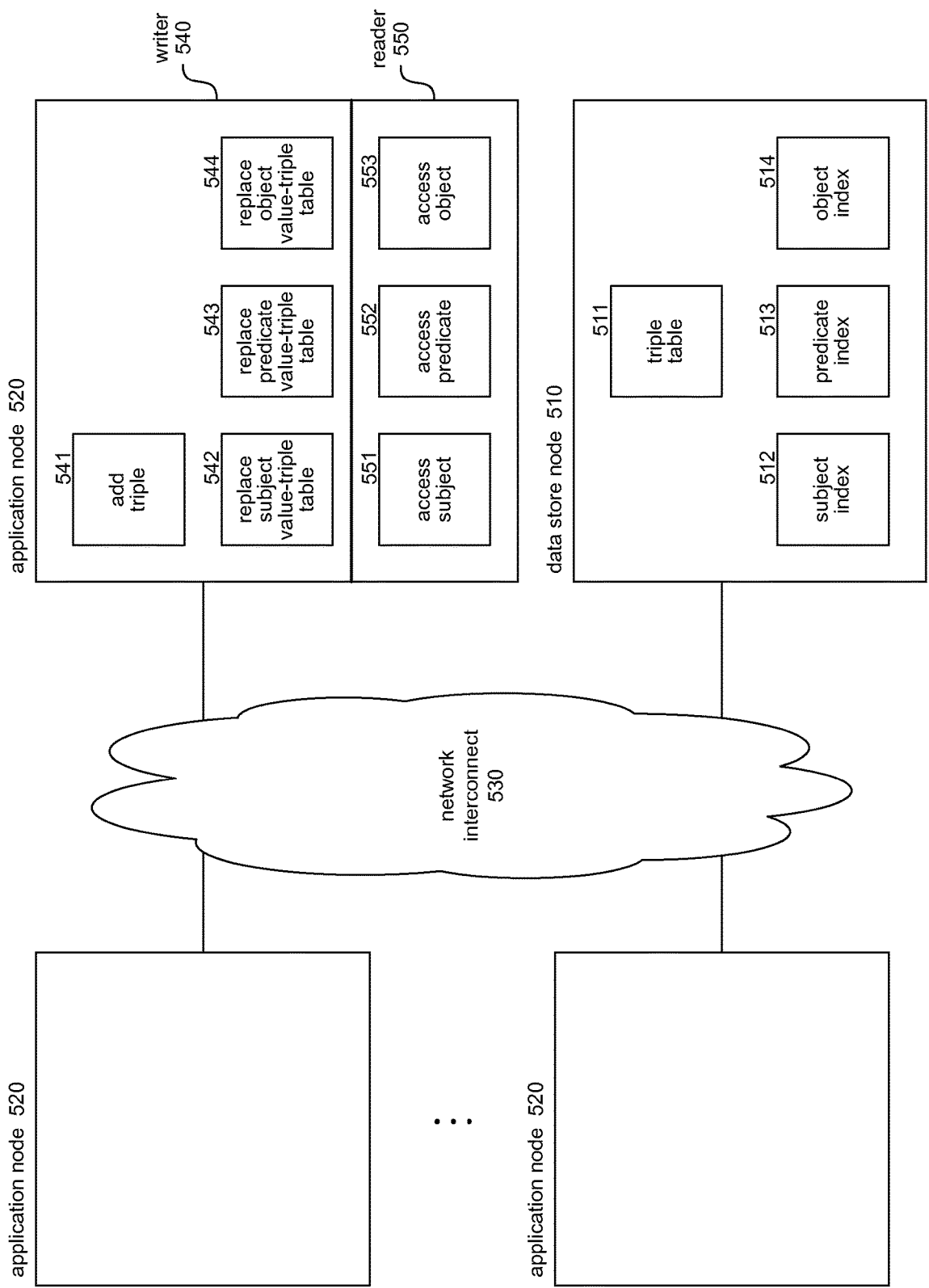
FIG. 5 is a block diagram that illustrates components of the indexing system in some embodiments.

FIG. 5 is a block diagram that illustrates components of the indexing system in some embodiments. A data store node 510 and application nodes 520 are connected via a network interconnect 530 to form a multiple node computer system such as a massively parallel processor ("MPP") computer system. The data store node includes a data store having a triple table 511, a subject index 512, a predicate index 513, and an object index 514. The data store is illustrated as being stored in the memory of a single node. However, the data store may be stored in a distributed shared memory with portions of the triple table and the indexes stored at different application nodes or more generally compute nodes. An application node includes writer components 540 and reader components 550. The writer components include an add triple component 541, a replace subject value-triple ("v-t") table 542, a replace predicate value-triple table 543, and a replace object value-triple table 544. The add triple component adds a new triple to the triple table and invokes the replace subject value-triple component, the replace predicate value-triple component, and the replace object value-triple component. The reader components include an access subject component 551, an access predicate component 552, and an access object component 553 for accessing the triple table using the corresponding index.

The processors on which the indexing system may be implemented may include a central processing unit and local memory and may include input devices (e.g., keyboard and pointing devices), output devices (e.g., display devices), and storage devices (e.g., disk drives). The processors may access computer-readable media that includes computer-readable storage media and data transmission media. The computer-readable storage media is tangible and may include memory and other storage devices that may have recorded upon or may be encoded with computer-executable instructions or logic that implements the indexing system. The data transmission media is media for transmitting data using signals or carrier waves (e.g., electromagnetism) via a wired or wireless connection. Various functions of the indexing system may also be implemented on devices using discrete logic or logic embedded as an application-specific integrated circuit. The devices on which the indexing system is implemented are computing devices and may include an MPP computing system with a distributed shared memory such as the Cray XMT.

The indexing system may be described in the general context of computer-executable instructions, such as program modules, executed by one or more computers, processors, or other devices. Generally, program modules include routines, programs, objects, components, data structures, and so on that perform particular tasks or implement particular data types. Typically, the functionality of the program modules may be combined or distributed as desired in various embodiments.

Figure 6:
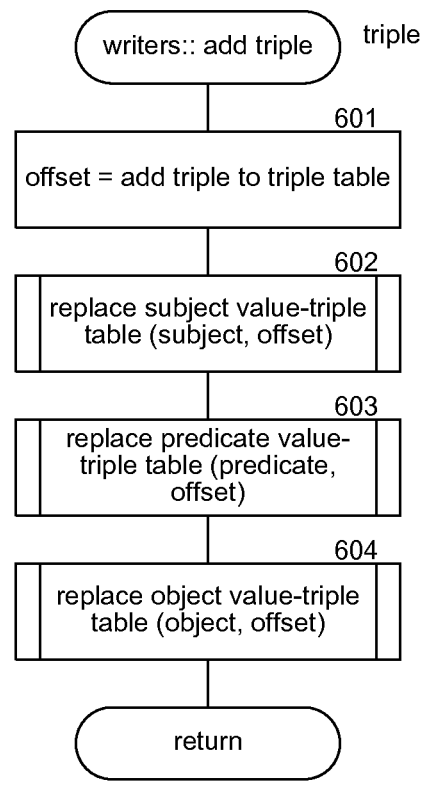
FIG. 6 is a flow diagram that illustrates the processing of the add triple component of the indexing system in some embodiments.

FIG. 6 is a flow diagram that illustrates the processing of the add triple component of the indexing system in some embodiments. The add triple component is passed an indication of a triple, adds the triple to the triple table, and then updates the indexes. In block 601, the component adds the triple to the triple table at an offset that is at the end of the triple table. In block 602, the component invokes the replace subject value-triple table component passing the subject of the triple and its offset in the triple table. In block 603, the component invokes the replace predicate value-triple table component passing the predicate of the triple and its offset in the triple table. In block 604, the component invokes the replace object value-triple table component passing the object of the triple and its offset in the triple table. The component then returns.

Figure 7:
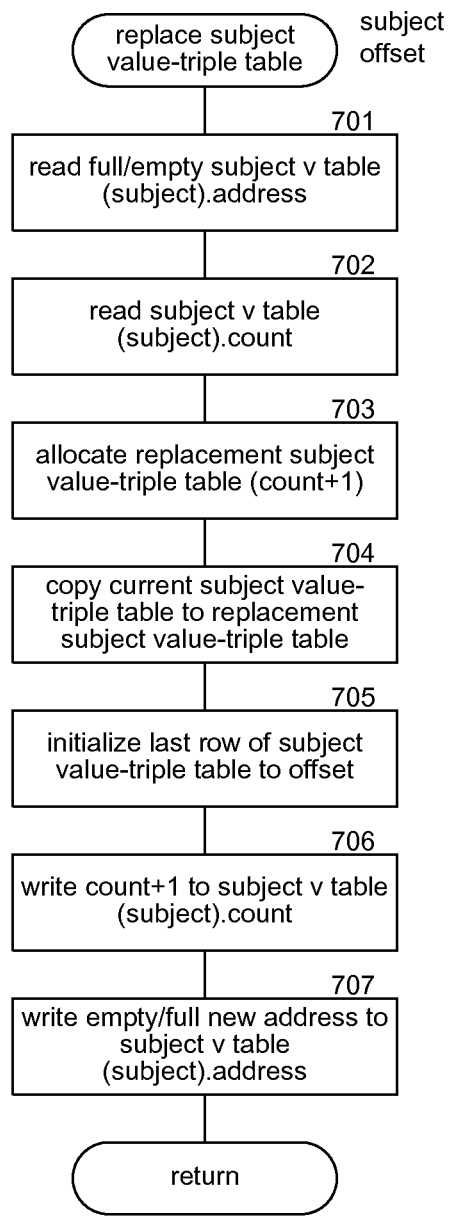
FIG. 7 is a flow diagram that illustrates the processing of the replace subject value-triple table component of the indexing system in some embodiments.

FIG. 7 is a flow diagram that illustrates the processing of the replace subject value-triple table component of the indexing system in some embodiments. The component is passed a subject of a triple and the offset of the triple in the triple table and updates the subject value-triple table to include the triple. In block 701, the component issues a read full/leave empty instruction to the address of the entry in the subject values table for the passed subject to lock the entry and retrieve the address of the subject value-triple table. In block 702, the component issues a read instruction to the count of the entry in the subject values table for the passed subject to retrieve the current count. In block 703, the component allocates a replacement subject value-triple table with an additional row for the new triple. In block 704, the component copies the current subject value-triple table (using the retrieved address) to the replacement subject value-triple table. In block 705, the component initializes the last row of the subject value-triple table to the passed offset. In block 706, the component issues a write instruction to the count of the entry in the subject values table for the passed subject to replace the previous count with the new count (e.g., previous count plus one). In block 707, the component issues a write empty/leave full instruction to the address of the entry in the subject values table for the passed subject to store the address of the replacement subject value-triple table and unlock the entry. The component then returns. The component may also de-allocate the old subject value-triple table. Although not illustrated in the figures, the processing of the replace predicate value-triple table component and the replace object value-triple table component is similar to that of the replace subject value-triple table component.

Figure 8:
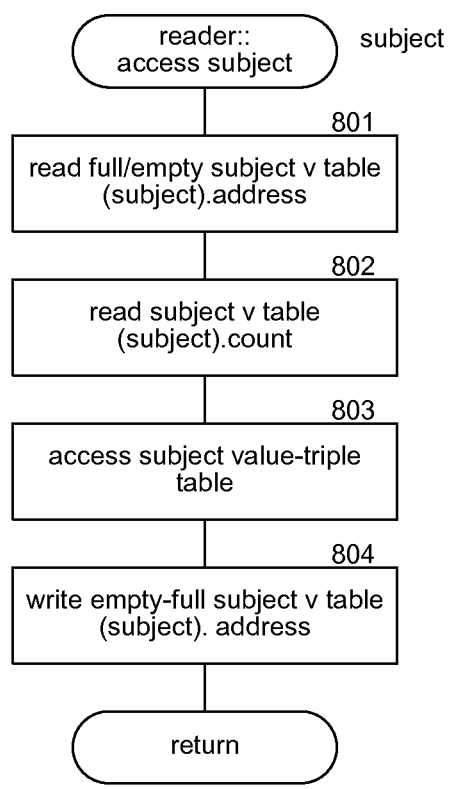
FIG. 8 is a flow diagram that illustrates the processing of an access subject component of the indexing system in some embodiments.

FIG. 8 is a flow diagram that illustrates the processing of an access subject component of the indexing system in some embodiments. The component is passed an indication of a subject and accesses the triples with that subject. In block 801, the component issues a read full/leave empty instruction to the address of the entry in the subject values table for the passed subject to lock the entry and retrieve the address. In block 802, the component issues a read instruction to the count of the entry in the subject values table for the passed subject to retrieve the number of rows that are in the subject value-triple table for the passed subject. In block 803, the component accesses the subject value-triple table referenced by the retrieved address to locate the triples in the triple table for the passed subject. In block 804, the component issues a write empty/leave full instruction to the address of the entry in the subject values table for the passed subject to restore the address of the subject value-triple table and unlock the entry. The component then returns.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, the tables may be implemented using various data structures such as linked lists, hash tables, tree structures, and so on. Also, a writer may add a group of tuples with the same index value to the tuple table at a time and update the value-tuple table for that index value once for the group. Also, the address of the entries in the values is used to lock the corresponding value-tuple tables in some embodiments. Alternatively, the count associated with the value-tuple table may also be used or a dedicated lock work may be used. Accordingly, the invention is not limited except as by the appended claims.

I claim:

1. A method performed by a computer system to update a tuple table of tuples, each tuple having fields, each field having a value, the tuple table having an index, the index being a data structure that maps index values for an indexed field to tuples that have the index values in the indexed field, the method comprising:

updating the tuple table for a tuple having a target index value in the indexed field; and updating the index by:

locking a portion of the index that maps the target index value to tuples without locking other portions of the index so that other portions can be accessed concurrently while the portion is locked;

after locking the portion, updating the portion to reflect the update to the tuple table; and after updating the portion, unlocking the portion wherein the index includes a values table, the values table including an entry for each index value of the indexed field and each entry having a reference to a value-tuple table for that index value that maps to tuples that have that index value in the indexed field, and wherein the locking is performed by issuing a read full/leave empty instruction to the reference of the entry for the index value and the unlocking is performed by issuing a write empty/leave full instruction to the reference of the entry for the index value.

2. A computer-readable storage storing an index for a tuple table, the tuple table having tuples with fields, each field having a value, the index for mapping index values of an indexed field to tuples that have the corresponding index values in the indexed field, the index comprising:

for each index value, a value-tuple data structure that identifies the tuples of the tuple table that have that index value in the indexed field, each value-tuple data structure being separately lockable so that a locked value-tuple data structure can be updated while locked without locking any other value-tuple data structure; and a values data structure that, for each index value, identifies the value-table data structure for that index value.

3. A computer system for adding a new tuple to a tuple table of tuples, each tuple having fields, each field having a value, the computer system comprising:

a memory storing computer-executable instructions to:

add the new tuple to the tuple table, the new tuple having a new index value in an indexed field; and update an index for the indexed field into the tuple table, the index including a value-tuple data structure for each index value of the indexed field that maps to the tuples of the tuple table that contain that index value, the instructions to update including instructions to:

lock the value-tuple data structure for the new index value without having to lock the value-tuple data structure for another index value;

after the value-tuple data structure is locked, update the value-tuple data structure for the new index value to map to the new tuple in the tuple table; and after the value-tuple data structure is updated, unlock the value-tuple data structure for the new index value; and wherein the memory further stores instructions to access by a reader the new tuple, the instructions to access including instructions to lock the value-tuple data structure for the new index value without having to lock the value-tuple data structure for another index value, retrieve the new tuple using the mapping of the value-tuple data structure for the new index value, and unlock the value-tuple data structure for the new index value a processor for executing the computer-executable instructions stored in the memory.

* * * * *